May 20, 1969

J. P. TOMANY 3,445,182

METHOD FOR REMOVING CHLORINE AND ENTRAINED ALUMINUM CHLORIDE
PARTICLES FROM A WASTE GAS STREAM

Filed Feb. 15, 1965

INVENTOR:
James P. Tomany

BY:
James R. Hoatson Jr.
Philip T. Liggett
ATTORNEYS

United States Patent Office 3,445,182
Patented May 20, 1969

3,445,182
METHOD FOR REMOVING CHLORINE AND ENTRAINED ALUMINUM CHLORIDE PARTICLES FROM A WASTE GAS STREAM
James P. Tomany, Darien, Conn., assignor to Universal Oil Products Company, Des Plaines, Ill., a corporation of Delaware
Filed Feb. 15, 1965, Ser. No. 432,675
Int. Cl. B01d 47/06, 47/12
U.S. Cl. 23—2                                    6 Claims

ABSTRACT OF THE DISCLOSURE

Method of removing chlorine and entrained aluminum chloride particles from a hot gaseous stream comprising cooling and agglomerating at least a portion of the particles in the gaseous stream by contacting it with a liquid spray which simultaneously absorbs chlorine and thereafter passing the gas upwardly through a loose mobile floating bed of contact elements in countercurrent contact with a descending stream of an alkaline absorbent solution.

---

Figure 2:
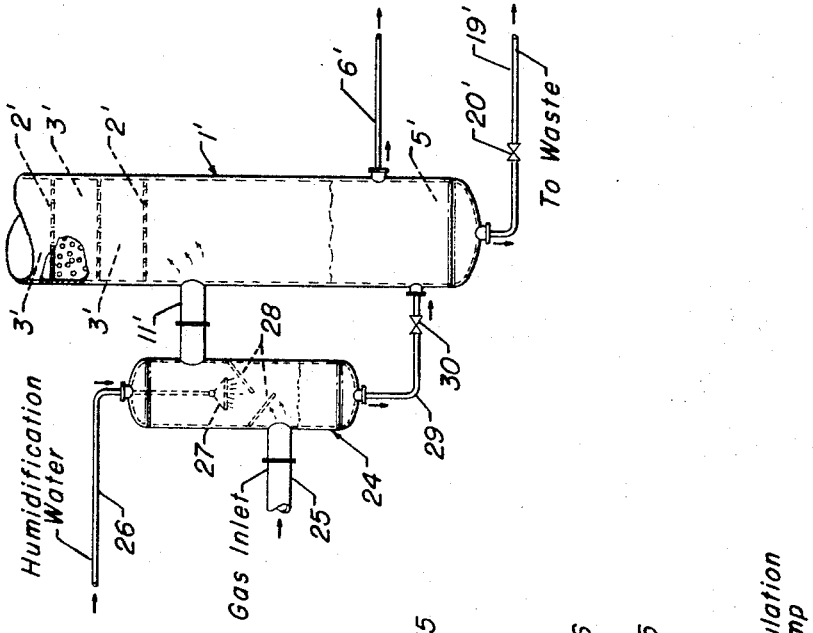

The present invention relates to an improved countercurrent scrubbing method for removing chlorine and entrained aluminum chloride particles from a waste gas stream. More particularly, the present improved system is directed to a liquid scrubbing treatment of a gaseous effluent stream from an aluminum smelting or purification operation which contains undesirable gaseous chlorine and aluminum chloride particles.

In carrying out secondary aluminum purification operations, it is customary to periodically introduce gaseous chlorine into molten batches of aluminum so as to effect a degasification thereof and the removal of resulting slag-like impurities. For example, chlorine will combine with the magnesium content of molten metal, where such metal may enter into the furnace along with aluminum scrap, to effect the formation of magnesium chloride which will in turn form a slag-like material that may be removed. However, the addition of chlorine gas to the molten metal may also form aluminum chloride which leaves the furnace in gaseous form. As the gas cools and sublimes, the aluminum chloride is converted to finely divided particulate matter which is in the size range of 0.1 to 1.0 micron so that as such material is released to the atmosphere there is a resulting dense opaque effluent. The effluent stream also contains air, chlorine, gaseous aluminum chloride and a small amount of magnesium chloride, all of which can be particularly obnoxious and damaging to the surrounding area.

Various systems have been used, or tried out, to effect the neutralization and removal of entrained particles from effluent streams of secondary smelting furnaces, as for example, the use of spray towers, packed towers, submerged inlet tanks, etc.; however, none of the previous types of systems have been entirely satisfactory. Packed bed towers are avoided as being particularly troublesome inasmuch as fixed bed packing becomes rapidly clogged with aluminum chloride fines and its efficiency impaired.

It is thus a principal object of the present invention to provide a floating bed type of gas scrubbing-particle collection operation which utilizes a countercurrent type of liquid contact in the presence of a multiplicity of relatively large and light weight contact elements. Such elements when of the proper type and when utilized under proper fluidized conditions can effectively collect or agglomerate the entrained fines from an up-flowing gaseous stream while at the same time permitting a down-flowing scrubbing liquid, together with a rotating and rubbing action between the multiplicity of floating elements to effect a continuous washing down of the collected material into a lower liquid collection portion of the contact unit.

It is also an object of the present invention to utilize an improved system where an alkaline wash stream provides for the neutralization of the acid effect of the absorbed chlorine and collected aluminum chloride in the scrubber unit.

Still another object of the present invention is to provide a multiple stage treatment system which has an initial agglomeration-humidifying step provided by a liquid spray stream first contacting the laden gas stream. The effluent gas stream from an aluminum smelting furnace operation carries much higher loadings of particulate matter than what might be considered normal; i.e., there may be of the order of 75 to 125 grains per cubic foot of aluminum chloride in the furnace effluent stream to carry to the treating system, as compared with usual types of laden streams having from 5 to 10 grains of particulate matter per cubic foot.

Broadly, the present invention provides a method for scrubbing and removing chlorine and entrained aluminum chloride particles in a gaseous effluent stream from an aluminum purification operation, in a manner which comprises, initially passing said gaseous stream into contact with a liquid spray stream and effecting an initial agglomeration and removal of some portion of entrained particles as well as a humidification of the effluent stream by a direct contact between the streams, subsequently passing the resulting humidified effluent stream upwardly through a contacting zone having at least one stage of low density contact elements, with such stream being at a rate maintaining the elements in a loose mobile floating bed that is in turn restrained to a limited upwardly movement by perforate barrier means defining said stage, introducing an alkaline scrubbing liquid to the upper portion of said contacting zone above said floating bed stage(s) of elements and effecting the continuous wetting of their surfaces and a resulting continuous countercurrent contacting of said effluent stream by said scrubbing liquid stream while said contact elements are maintained in said loose, mobile floating bed condition by the velocity of said gas stream, discharging a resulting scrubbed effluent stream from the upper portion of said contacting zone substantially free of chlorine and entrained aluminum chloride particles, and withdrawing from the lower portion of said contacting zone a used scrubbed liquid stream containing absorbed and entrained components from the effluent stream.

As indicated hereinbefore, as an example, chlorine gas is periodically introduced into the mass of molten metal within an aluminum smelting furnace so as to assist in gas release and the removal of magnesium chloride slag as an impurity. The effluent from the smelting furnace has the abnormally high loadings of aluminum chloride particles and also is generally at a relatively high temperature above 600° F. and up to the order of 1200° F. Thus, in accordance with the present improved system, a preferred operation utilizes the initial gas stream contact with a spray stream of water, or of slightly alkaline liquid, such that there is a pre-agglomeration of particles and a humidifying of the gaseous stream with a tertiary effect of the initial spray stream being to lower the temperature of such stream where it is excessively high.

It is also a feature of the present improved system to utilize a slightly caustic scrubbing liquid, as for example, a 5% sodium hydroxide solution within the scrubbing zone. It appears that the use of the alkaline solution within the scrubber not only improves the collection efficiency, but also provides for the discharge of a neutral or slightly alkaline liquid to waste from the outlet of the scrubber zone. A sodium hydroxide solution reacts with aluminum chloride in the gaseous effluent stream to yield aluminum hydroxide in accordance with the reaction:

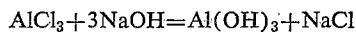

$$AlCl_3 + 3NaOH = Al(OH)_3 + NaCl$$

At the same time, excess chlorine in the effluent gas stream will react with the caustic solution to produce sodium hypochlorite in accordance with the reaction:

$$Cl_2 + 2NaOH = NaCl + NaClO + H_2O$$

The alkalinity of the caustic solution may, of course, vary in accordance with the quantity of excess chlorine and the quantity of aluminum chloride which is entrained in the discharge gases from the secondary smelting furnace. Generally, a 3% to about 10% caustic solution will suffice to hold the alkalinity of the scrubbing liquid to a suitable pH level above 7 and generally to about 11. The floating bed scrubbing system may be provided with a caustic solution surge tank that is arranged to receive the collected slurry from the lower portion of the scrubbing tower section whereby a continuous stream of agglomerated material may be discharged from the lower end of the surge tank and a scrubbing liquid stream recirculated from the upper portion of the tank to the spray means at the top of the contact zone for reuse in the counter-current contacting of the gas stream over the surfaces of the contact elements. One or more stages or stacked zones to accommodate beds of contact elements may be used to effect the desired highly efficient countercurrent flow of scrubbing liquid and waste gas stream in a manner similar to that set forth in U.S. Patent No. 3,122,594 issued to A. W. Kielback on Feb. 25, 1964. In accordance with the teachings of the aforementioned patent, lightweight or low density contact elements which may, for example, comprise hollow plastic spheroidal members with a dimension of approximately 1½ inches in diameter are used in each of the contact zones to provide a high surface area contact between the gas and liquid mediums. Each of the separate stages or zones may be defined by suitable perforate plate means that will limit the movement or elevation of contact elements within each zone. Thus, with a suitable adjustment of gas flow and liquid flow rates there will be the fluidization and random movement of the low density contact elements within each of the stages of the scrubber unit and channeling essentially absent. The random and rotational movements of each of each of the multiplicity of elements in each zone provides for the entrapment of entrained particulate material while at the same time permitting the continuous washing and removal of agglomerated particulate material from the surfaces of the spheres so that the material continuously works to a lowermost portion of the contact zone and into a liquid collection section of the scrubbing tower for discharge through a waste line or for circulation to surge tank.

The scrubber tower is, of course, of a vertically elongated construction providing for the introduction of a gaseous effluent stream into a lower part of the column below the first stage of contact elements and above the liquid collecting zone. The upper portion of the tower may be provided with suitable liquid de-entrainment means or mist extractor means such that a minimum quantity of scrubbing liquid is discharged from the upper portion of the scrubber unit to the outlet stack. In addition, and where desirable, there may be provision for introducing a bleed-in air stream below the zones containing the contact elements to compensate for variations in the amount of effluent stream flow and generally stabilize gas flow through the zones with the contact elements.

In one embodiment of the scrubbing section of the improved operating system there may be provision for the initial humidifying spray liquid to be introduced above the gas inlet to the scrubbing tower and directly below the inlet to the first stage of contact elements. However, as an alternative design and arrangement, there may be a separate humidifying chamber where water or slightly alkaline liquid stream is used to effect a humidifying agglomerating step on the gas stream prior to its introduction to the one or more zones of contact elements in the countercurrent scrubbing section.

Reference to the accompanying drawing and the following description thereof will serve to further illustrate the handling of effluent gases from an aluminum smelting furnace operation which may contain substantially large quantities of chlorine and aluminum chloride, as well as indicate modifications in operation for effecting an efficient scrubbing system.

Figure 1:
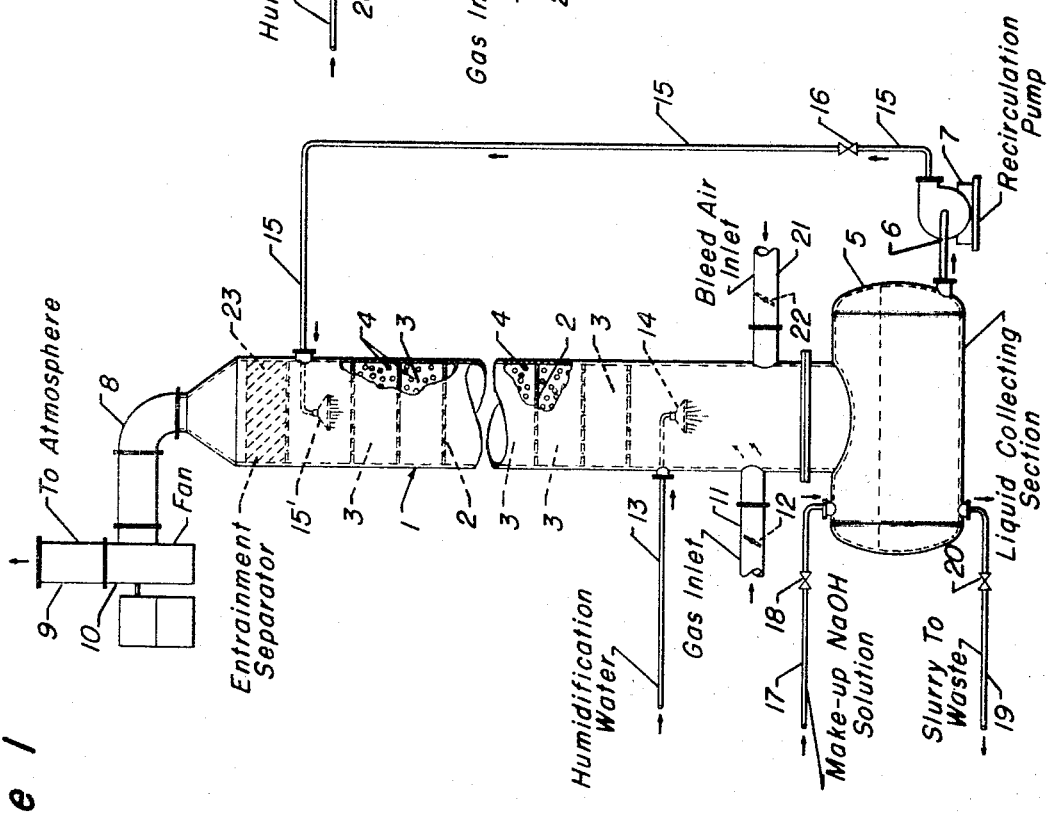

FIGURE 1 of the drawing indicates in a diagrammatic elevational manner a method of effecting countercurrent scrubbing of a gaseous effluent stream within a vertically elongated scrubbing tower unit having a plurality of superposed stages adapted to contain lightweight contact elements for a floating bed contacting operation.

FIGURE 2 of the drawing indicates diagrammatically a modification in the design and arrangement of the lower portion of the scrubbing tower, with means for having a separate agglomerating-humidifying chamber to effect the initial contact of the effluent gas stream with a liquid spray stream.

Referring now more particularly to FIGURE 1, there is indicated a vertically elongated tower 1 with a plurality of internal horizontally disposed perforated plate members 2 which in turn divide the tower into a plurality of superposed contact zones 3 for accommodating beds of contact elements 4. A multiplicity of low density contact elements 4 are, of course, utilized in each of the separate zones 3, such that they can operate as a fluidized moving bed of elements for each of the independent zones or stages of contact. The contact elements 4 may be thin walled spheres of metal or plastic having a smooth outer surface or, alternatively, they may be of a foam-like nature formed of foamed plastics such as polyurethane, polystyrene, or the like, whereby fluidization and random movement may be effected by an up-flowing gaseous stream to be scrubbed, substantially in accordance with the teachings of the aforementioned Patent No. 3,122,594.

The lower end of tower 1 is indicated as being provided with a liquid collecting reservoir section 5 having outlet line 6 connect with pump means 7. The upper end of the tower 1 is provided with conduit or duct means 8 which in turn connects with a stack 9 having fan means 10 to maintain a constant suction on the upper portion of the tower. The gas stream inlet line 11, with flow control damper means 12, connects with the lower portion of the scrubber tower 1 at a level above the upper portion of the collection section 5 such that the gas stream may be subsequently admitted to rise upwardly through each of the contact zones 3. However, in accordance with the present invention, a humidification liquor inlet line 13 is provided to connect with an internal spray head 14 at a level just below the lowermost contact zone 3 such that water, or a slightly alkaline liquid stream, may effect an initial spraying and contacting of the gas inlet flow prior to the latter entering the upper contact zones 3.

At an upper level of tower 1, above the uppermost contact zone 3, there is a line 15 connective with an internal spray head 15' that serves to introduce the principal quantity of alkaline scrubbing liquid which continuously carries downwardly through each of the successive contact zones 3 countercurrently to the upward gas flow of the waste gas stream entering by way of conduit 11. In the actual operation of the unit, as hereinbefore set forth, the gas and liquid flows are adjusted such that the light weight contact elements 4 in each of the superposed zones are caused to float above a lower perforate plate 2 and effect a random rotational floating bed action for each of the individual elements 4. There is thus insured an interphase contact between the highly laden gas stream and the liquid stream with a substantial prevention of the channeling of either stream through the unit. Each of the spaced perforate plate members 2, of course, assist in effecting a redistribution of the gas and liquid streams at each of the vertically stacked separate zones 3.

The present embodiment of FIGURE 1 indicates a pump 7 discharging into the line 15, having control valve 16, so as to recycle scrubbing liquor to the upper contact zones 3. Make-up sodium hydroxide solution is periodically, or continuously, introduced into the lower collection section 5 by way of inlet line 17 and control valve 18, so as to insure an adequate quantity and proper pH solution within the system. A waste slurry stream from the lower portion of section 5 may be discharged by way of line 19 and control valve 20.

A scrubber or contact tower of preferred design utilizes one or more mist extraction means or de-entrainment means at the upper end of the tower ahead of the discharge line such as indicated diagrammatically in the drawing as 23. Thus, a minimum quantity of liquid is permitted to be entrained and carried to the atmosphere by way of outlet conduit 8 and stack means 9.

For purposes of controlling and stabilizing gas flow through the unit, the embodiment of FIGURE 1 indicates diagrammatically the use of a bleed-in air inlet duct 21 with control damper means 22 at the lower end of the scrubber tower below the first contact zone 3. Such bleed-in air stream may be controlled manually or automatically and, as indicated hereinbefore, the introduction of air shall be used primarily to compensate for fluctuations in effluent stream flow to the unit and stabilize upward flow through contact zones 3. The bleed-in air stream may also be used to assist in tempering a high temperature gas stream being introduced to the scrubber tower.

Referring now particularly to FIGURE 2 of the drawing, there is shown the lower portion of a scrubbing tower unit 1' having a lower liquid reservoir section 5', a lowermost contacting zone 3' defined by perforated plate members 2' and a gas inlet line 11'. The latter is adapted to receive an initially humidified effluent stream from a separate humidification chamber 24 which in turn receives the heavily laden gas stream by way of inlet line 25. An agglomerating-humidifying liquid stream is introduced by line 26 and spray nozzle 27 such that the liquid sprays downwardly and countercurrenly with respect to the rising effluent gas stream in the lowerportion of the column 24 over baffle plates 28. Collected liquid within the lower portion of chamber 24 is indicated as being transferred into the reservoir section 5' at the lower end of column 1' by line 29 having control valve 30. Slurry from the liquid reservoir section 5' may in turn be discharged by way of line 19' and valve 20' while liquid from the upper portion of section 5' may be withdrawn by way of line 6' through recirculation pumping means so as to provide at least a portion of the downward liquid flow through contact zones 3' in column 1'.

It is not intended to limit the present improved system to any one method for effecting the initial humidifying-agglomerating step, for as indicated hereinbefore, such step may be provided by spray means directly encompassed within the lower portion of the scrubbing tower or, alternatively, may be embodied within a separate humidifying chamber such as provided by column 24 in FIGURE 2 of the drawing. The humidifying stream may be water or alternatively a specially prepared stream providing some alkalinity with the use of sodium hydroxide or other alkaline agent, whereby there may be an initial pre-neutralization step along the humidification and agglomeration of the heavily laden gas stream prior to its entry into the superimposed contacting zones and the presence of the contact elements therein.

In order to set forth more clearly certain benefits as provided by the present improved scrubbing system, reference may be made to the following comparative operations.

EXAMPLE I

In one example of the employment of a multi-stage floating bed contactor or scrubber, such as of the type of FIGURE 1 of the drawing, using multiplicity of hollow plastic spheres of approximately 1½ inches in diameter for contact elements, there is provided for the countercurrent liquid treating of some 2000 standard cubic feet per minute (s.c.f.m.) of effluent gas stream containing free chlorine, aluminum chloride vapor and aluminum chloride particles. With the effluent originating from a molten aluminum purification or smelting system, the stream is at a high temperature of the order of 800° F. and is heavily laden with aluminum chloride particles to provide 150 grains per standard cubic foot of effluent gas.

Utilizing an initial humidifying and agglomerating water spray of 2 gallons per minute across the area of the contactor and below the zones of contact elements, as well as the use of some 75 gallons per minute of a 5% sodium hydroxide solution for the primary scrubbing liquor through the upper part of the contactor, there is a reduction in solids loading from 150 to 0.75 grains per cubic foot (s.c.f.) in the effluent stream. The resulting efficiency of removal thus is 99.5%. The effluent gas stream temperature leaving the contactor is of the order of 90° F. and the averaged quantity of aluminum chloride solids leaving the scrubber with a liquor effluent stream is about 2.0 pounds per hour.

EXAMPLE II

In another example of gas stream scrubbing, there is again considered the treatment of an effluent gas stream from an aluminum purification system such that there is free chlorine in the gas and a resulting relatively heavy aluminum chloride particle loading of some 60 grains per standard cubic foot. With the employment of the same type of multistage floating bed scrubber as considered for Example I except for the elimination humidification-agglomeration spray stream, there is received 1600 s.c.f.m. of effluent gas at a temperature of the order of 750° F. Again, this effluent stream is treated with a principal scrubbing liquor stream, comprising 5% sodium hydroxide, at a rate providing 75 gallons per minute down through the column to effect the desired countercurrent contacting in the presence of the floating and moving plastic spheres. In this instance, there is a reduction of particle loading in the gas stream leaving the contactor to provide of the order of 0.24 grains of aluminum chloride per s.c.f. with a resulting scrubbing efficiency of 99.6%. The gas stream temperature from the contactor is of the order of 70° F. and the solids content of the effluent liquor from the bottom of the unit is of the order of 80.0 pounds per hour.

For convenience and reference purposes, the foregoing data of the ilustrative examples are set forth in the accompanying table.

The collection or particle removal efficiency for both of the examples described is shown to be substantially equal; however, this may be true for only a relatively short period of time since, in the absence of the use of an initial humidifying water stream, there will be a continuing build-up of temperature in the liquid collecting zone of the system, as well as a rapid lessening of the solids dilution effect. A temperature rise in the recirculated stream to the top of the contactor unit means greater vapor loses from the stack along with the effluent gas stream, as well as impaired agglomeration, scrubbing and dissolving of the aluminum chloride in the liquor stream. It will be noted in Example II that in the absence of the use of the humidification water there is less solids dilution and a relatively high undesirable amount of solids in the liquor effluent from the unit, i.e. at the rate of some 80 pounds per hour.

Although not set forth in either of the illustrative examples, it should be noted that the pH of the scrubbing liquor shall be above 7 and preferably at the level of about 11 so as to obtain the benefit of the reactive effect between the caustic stream and the acidic aluminum chloride being agglomerated and collected.

portion of entrained particles as well as chlorine absorption and a humidification of the effluent stream by a direct contact with the liquid water stream, subsequently

TABLE

| | Gas Flow, s.c.f.m. | Temperature, °F. | | Solids loading, grains/s.c.f. | | Efficiency, percent | Humidification H²O, Gal./Min. | Liquor effluent solids (lbs./hr.) |
|---|---|---|---|---|---|---|---|---|
| | | Inlet | Outlet | Inlet | Outlet | | | |
| Run No. 1 | 2,000 | 800 | 90 | 150 | 0.75 | 99.5 | 2.0 | 2.0 |
| Run No. 2 | 1,600 | 750 | 70 | 60.0 | 0.24 | 99.6 | 0 | 80.0 |

I claim as my invention:

1. A method for scrubbing and removing chlorine and enerained aluminum chloride particles from a high temperature heavily laden gaseous effluent stream containing the same, which comprises, initially passing said gaseous effluent stream into contact with a liquid spray stream and effecting an inital agglomeration and removal of some portion of entrained particles as well as chlorine absorption and a humidification of the effluent stream by a direct contact with the liquid stream, subsequently passing the resulting humidified gaseous effluent stream upwardly through a contacting zone having at least one stage of low density contact elements, with such stream flow being at a rate maintaining the elements in a loose mobile floating bed that is in turn restrained to a limited upward movement by perforate barrier means defining said stage, introducing an alkaline scrubbing liquid to the upper portion of said contacting zone above and uppermost floating bed stage of elements and effecting the continuous wetting of their surfaces and a resulting continuous countercurrent contacting of said effluent stream by said scrubbing liquid stream while said contact elements are maintained in said loose, mobile floating bed condition by the velocity of said gas stream, discharging a resulting scrubbed effluent stream from the upper portion of said contacting zone substantially free of chlorine and entrained aluminum chloride particles, and withdrawing from the lower portion of said contacting zone a used scrubbing liquid stream containing absorbed and entrained components from the effluent stream.

2. The method of claim 1 further characterized in that said alkaline scrubbing liquid to the upper portion of said contacting zone comprises from about 3% to about 10% sodium hydroxide.

3. The method of claim 1 further characterized in that said initial contact of said effluent stream is effected directly below a first stage portion of said contacing zone whereby the initial agglomeration-humidification liquid intermingles with the scrubbing liquid stream descending from such first stage portion of the contacting zone to preclude temperature and solids buildup in the lower portion of said contacting zone.

4. The method of claim 1 further characterized in that said initial contact of said effluent stream is effected countercurrently in a separate agglomerating-humidifying zone whereby a resulting humidified stream enters said contacting zone for countercurrent contact with an alkaline scrubbing liquid in the presence of said contact elements.

5. A method for scrubbing and removing chlorine and entrained aluminum chloride particles from a high temperature heavily laden gaseous effluent stream containing the same, which comprises, initially passing said gaseous effluent stream into contact with a water spray stream and effecting an initial agglomeration and removal of some portion of entrained particles as well as chlorine absorption and a humidification of the effluent stream by a direct contact with the liquid water stream, subsequently passing the resulting humidified effluent stream upwardly through a contacting zone having at least one stage of low density contact elements, with such stream flow being at a rate maintaining the elements in a loose mobile floating bed that is in turn restrained to a limited upward movement by perforated barrier means defining said stage, introducing an alkaline sodium hydroxide containing scrubbing liquid stream to the upper portion of said contacting zone above the uppermost floating bed stage of elements and effecting the continuous wetting of their surfaces and a resulting continuous countercurrent contacting of said effluent stream by said scrubbing liquid stream while said contact elements are maintained in said loose, mobile floating bed condition by the velocity of said effluent stream, discharging a resulting scrubbed stream from the upper portion of said contacting zone substantially free of chlorine and entrained aluminum chloride particles, passing a used scrubbing liquid stream containing absorbed chlorine and entrained aluminum chloride particles from the lowermost floating bed stage of elements to a lower confined liquid zone collection in a flow intermingled with said initial spray stream for agglomeration and humidification, discharging an aluminum chloride containing slurry from the lower portion of such zone and recycling a sodium hydroxide containing scrubbing liquid from an upper portion of such liquid collection zone to the upper portion of said contacting zone to provide at least a major portion of the scrubbing liquid being introduced thereto as aforesaid.

6. The method of claim 5 further characterized in that a make-up sodium hydroxide solution is added to said lower liquid collection zone to maintain a desired alkaline liquor inventory in said system to replace scrubbing liquid losses with slurry stream being discharged from such zone, while at the same time overcoming excessive dilution from the continuous addition of the initial humidification spray stream and the maintenance of a desired alkaline stream for said scrubbing liquid being introduced to the upper portion of said contact zone.

References Cited

UNITED STATES PATENTS 3,122,594   2/1964   Kielback _____ 23—2 X

OTHER REFERENCES

Jacobson: "Encyclopedia of Chemical Reactions," Reinhold Publishing Company, New York, N.Y., vol I, 1946, p. 80.

OSCAR R. VERTIZ, Primary Examiner.

E. C. THOMAS, Assistant Examiner.

U.S. Cl. X.R.

23—96, 219